Oct. 21, 1958 K. A. KAROW 2,857,468
TESTING APPARATUS FOR TELEPHONE SYSTEMS
Filed June 30, 1955 2 Sheets-Sheet 1
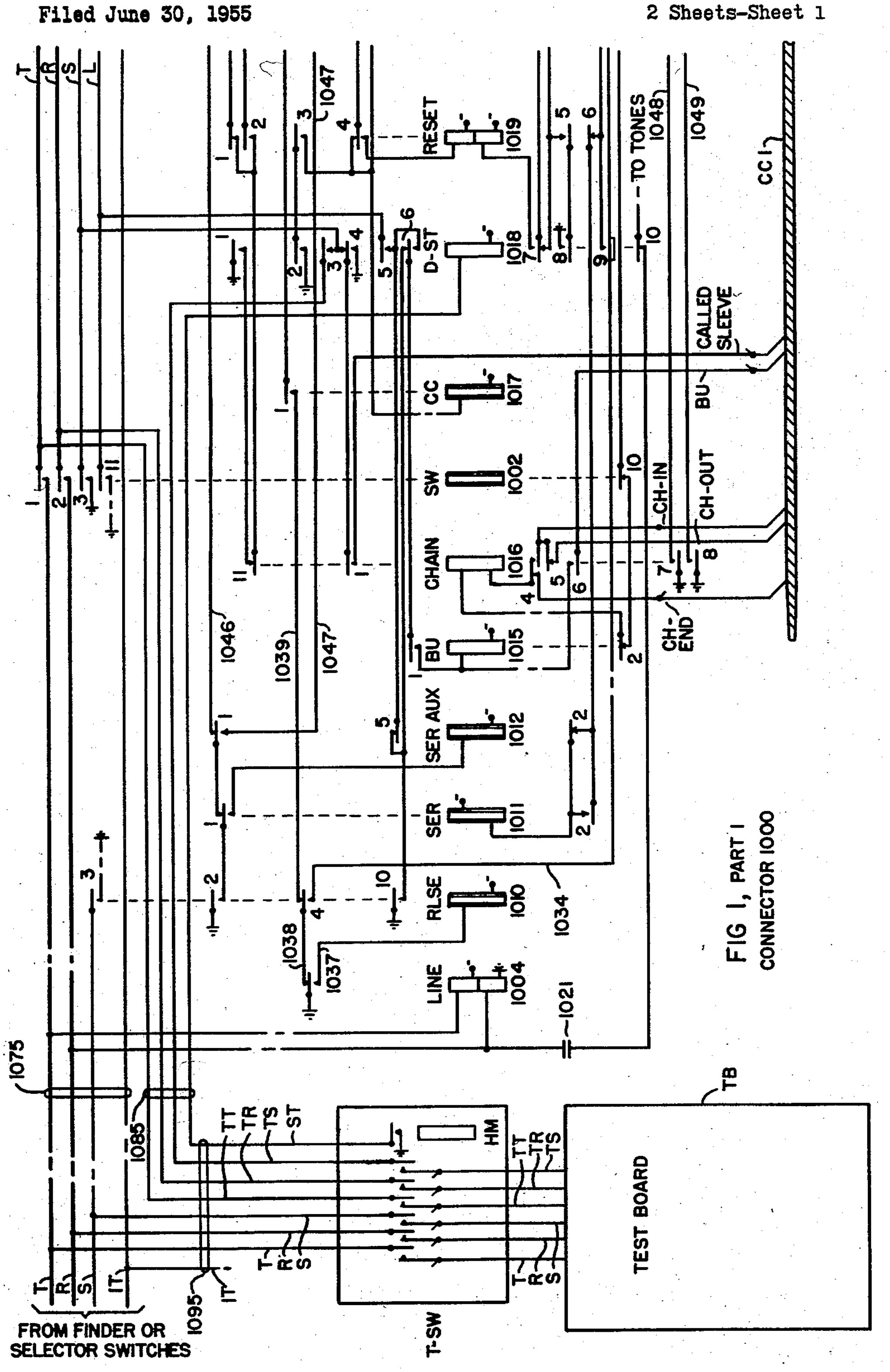
FIG 1, PART I CONNECTOR 1000

Oct. 21, 1958 K. A. KAROW 2,857,468
TESTING APPARATUS FOR TELEPHONE SYSTEMS
Filed June 30, 1955 2 Sheets-Sheet 2
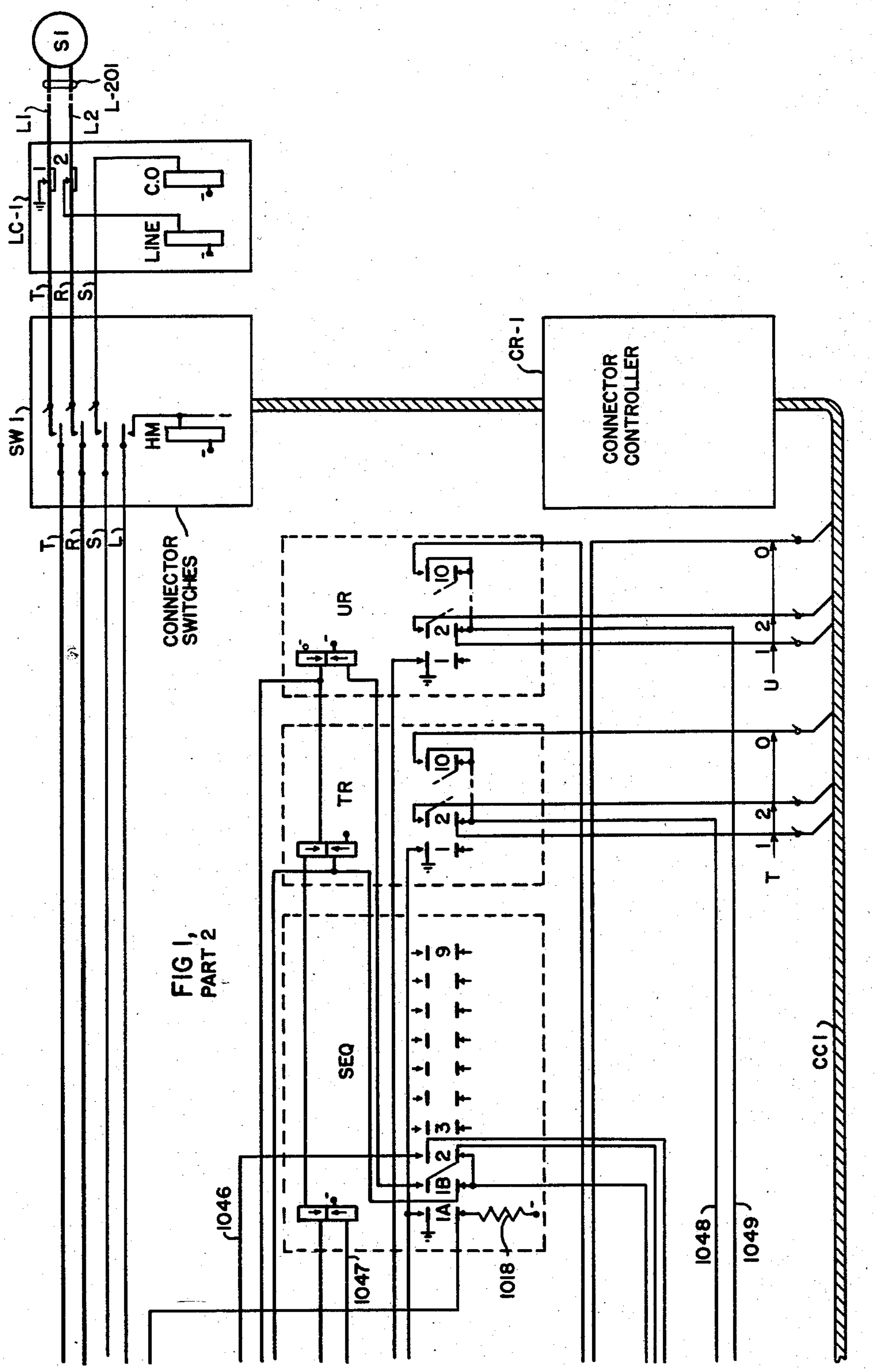
FIG 1, PART 2

United States Patent Office 2,857,468

Patented Oct. 21, 1958

2,857,468

TESTING APPARATUS FOR TELEPHONE SYSTEMS

Kenneth A. Karow, Chicago, Ill., assignor to International Telephone and Telegraph Corporation, New York, N. Y., a corporation of Maryland Application June 30, 1955, Serial No. 519,183

5 Claims. (Cl. 179—18)

This invention relates in general to testing apparatus for telephone systems and more particularly to circuit facilities employed in such systems for establishing test connections to subscriber lines. Its principal object is to provide simple and economical connecting equipment which is accessible to subscribers for establishing regular telephone connections and which is accessible to authorized personnel for establishing test connections.

In telephone exchanges wherein the cost of providing a separate test connector for each group of regular connectors is prohibitive, a combined regular and test connector is usually provided, such connector functioning as a regular connector on calls from subscriber lines and functioning as a test connector on calls from test lines, such as lines extending to a test board.

In connectors of the above character, arrangements must be provided which restrict the telephone subscribers from availing themselves of the test features of the connector yet permit testing personnel to have access thereto. Accordingly, a feature of this invention resides in a simple and economical arrangement for converting a combined test and regular connector for regular operation to test operation, such conversion providing the test board personnel with direct access to the lines without any line attachments connected thereto.

Another feature resides in the arrangement for controlling the crossbar switches to establish a succession of test connections to subscriber lines without resetting the test train from the test board to the test connector on each new connection.

Another feature, resides in the connector arrangement for permitting the common control equipment to be reused repeatedly for test connections but to be limited to one operation for regular connections.

A further feature resides in the arrangement for converting a test board control indication into a two-digit line locational number which controls the common equipment to establish a test connection to a different line, irrespective of whether such line is in the same numerical line group or not.

It has been chosen to embody the invention in a connector stage such as disclosed in the United States patent application of E. J. Leonard for a 100-line Direct-Access Crossbar Telephone Switching System, Serial No. 414,845, filed March 8, 1954. In such application, the connector records the dialed digit information and calls in the common control equipment to control the crossbar switches accordingly. In the present invention, on test calls, the digit recorders after being once set, are arranged to respond to the dialing of additional digits to operate the recorder to index different lines, arrangements being provided which permit the common equipment to then respond to the new recorder setting to complete a test connection to the newly-indexed line.

The operation of the combined regular and test connector is generally similar to the connector of the noted Leonard application, except as hereinafter pointed out.

The above-mentioned and other features and objects of this invention and the manner of attaining them will become more apparent and the invention itself will be best understood, by reference to the following description of an embodiment of the invention taken in conjunction with the accompanying drawing, wherein a regular connector 1000, modified for handling test connections is shown, together with an associated controller CR–1 and crossbar switches SW1, the controller and switches being assumed to be similar to the corresponding apparatus of the noted Leonard application. A test board TB and associated test switch T–SW, shown in block diagram, function to permit authorized personnel to have access to connector 1000 for testing purposes.

A detailed description of the operation of connector 1000 in handling calls originated from subscriber lines will now be described, followed by a description of its operation in handling test board calls.

As described in the noted Leonard application, following the dialing of the connector group containing connector 1000, connector 1000 is seized by the closure of the calling line loop across the tip and ring conductors T and R when the preceding equipment finds battery potential appearing on the idle test conductor IT from current-limiting resistor 1018. This closed loop is extended over trunk branch 1075 to the battery and ground connected windings of line relay 1004 through contacts not shown. Line relay 1004 operates and at its make contacts grounds wire 1037 to operate release relay 1010.

Release relay 1010 at its make contacts 3, extends ground potential rearwardly on the sleeve conductor S to maintain the preceding connection intact; at its make contacts 2 prepares an operate circuit for series auxiliary relay 1012, subject to the receipt of dial pulses; at its make contacts 4 connects pulsing wire 1038 to wire 1034 in preparation for delivering stepping impulses through the contacts of the sequence device Seq to the respective registers TR and UR; and at its make contacts 10 prepares a locking circuit for relay 1015.

Since the seizure of connector 1000 is accomplished during the interdigit period following the dialing of the hundreds digit selecting the connector group of which connector 1000 is a part, the tens and units digits of the directory number are immediately dialed thereafter, stations register SR of the Leonard application being omitted as this connector is assumed to have access to single-party lines only.

Each time the calling device (not shown) is operated to transmit a series of circuit interruption impulses, line relay 1004 is restored momentarily for each such interruption impulse.

Release relay 1010 remains operated throughout any impulse-induced restoration of line relay 1004, it being slow-restoring because of the copper sleeve under its winding. Series relay 1011 operates promptly upon the first restoration of line relay 1004, its operating circuit being from ground at break contacts of line relay 1004, conductor 1038, contacts 4 of relay 1010, conductor 1034, break contacts 2 on the sequence device Seq, break contacts 6 of relay 1019, break contacts 2 of series auxiliary relay 1012, and other contacts not shown, to the battery-connected winding of series relay 1011. Upon operating, series relay 1011 locks independent of the series auxiliary relay 1012 and at its make contacts 1 closes an operate circuit for the battery-connected winding of the series auxiliary relay 1012.

Series auxiliary relay 1012 operates and at its contacts 1 prepares an operate circuit for advancing sequence counter Seq.

With release relay 1010 maintained continuously operated, each restoration of line relay 1004 delivers an impulse at its break contacts to wire 1038 extending through break contacts 2 of sequence counter Seq as noted. These ground impulses constituting the tens digit are further extended to the battery-connected operate winding of the tens register TR through break contacts 1B of register Seq. The contact sets 1 to 10 of register TR are actuated successively, responsive respectively to the impulse constituting the tens digit. When line relay 1004 comes to rest, operated, at the end of any digit series of impulses, series relay 1011 restores after a slight delay and opens the operate circuit of series auxiliary relay 1012 which restores sequentially a short time later. At such time, when series relay 1011 is restored and series auxiliary relay 1012 is yet operated, the ground from make contacts 2 of release relay 1010 is transmitted over wire 1047 to the battery-connected operate winding of the sequence device Seq, thereby delivering a stepping impulse to such winding.

This stepping impulse which is delivered to counter Seq at the end of the receipt and the registration of a tens digit causes both its contact sets 1A and 1B to shift to their alternate positions, such operation connecting the pulsing wire 1034 to the units register UR and disconnecting it from the tens register TR, in addition to the other functions it performs as described in the noted Leonard application.

Responsive to the dialing of the units digit of the dialed directory number, the hereinbefore described operation of relays 1011 and 1012 takes place, the impulses constituting the units digits also being transmitted through make contacts 1B of sequence counter Seq to the battery-connected winding of units register UR to cause it to actuate its contact sets according to the digit dialed.

Responsive to the completion of the dialing of the units digit, the line relay comes to rest operated and as hereinbefore described delivers a second stepping impulse to counter Seq causing it to shift its contact sets 2 to their alternate position connecting wire 1046 to one side of chain relay 1016. At such time, connector 1000 transmits a demand indication to connector controller CR–1 over the associated conductors CH–In, CH–Out, and CH–End of cable CC1 in the manner described in the noted application.

If the battery supply circuit in the connector controller CR–1 is complete to the chain-in wire CH–In extending to one side of the winding of chain relay 1016, chain relay 1016 operates and at its contacts 4 and 5 individualize connector 1000 with controller CR–1, preventing any other connectors in the same group from taking the common equipment for use at the same time. The operate circuit starting at ground at make contacts 2 of relay 1010 and including break contacts 1 of relay 1011 and 1012, wire 1046, make contacts 2 of counter Seq, break contacts 10 of switch relay 1002, break contacts 2 of busy relay 1015, and other contacts not shown.

Contacts 1 of chain relay 1016 connects the called sleeve conductor S to the sleeve test relays of connector controller CR–1 as described in the noted Leonard application for determining the busy or idle condition of the called line and its make contacts 7 and 8 ground wires 1048 and 1049, respectively, such grounded conductors, through contacts on registers TR and UR, energizing the selected ones of the digits wires T1 to T10 and U1 to U10 extending to connector controller CR–1.

As described in the Leonard application, the grounded tens and units wires operate the concerned auxiliary select magnet and principal select magnet (not shown) of switch SW1 to select the called line. Thereafter, off-normal contacts on the auxiliary select magnet operate the hold magnet HM which is individual to connector 1000.

Responsive to the operation of the hold magnet associated with calling connector 1000, the tip, ring, and sleeve conductors T, R, and S are extended to connector circuit 1000, the called sleeve conductor being further extended to connector controller CR–1 through make contacts 1 of chain relay 1016.

In the event the called line is busy, operations occur in connector controller CR–1 to ground the busy wire BU extending to the battery-connected winding of busy relay 1015 through make contacts 6 of chain relay 1016. Busy relay 1015 upon operating opens the operate path of chain relay 1016, permitting it to restore and release the common control apparatus in the manner described in the Leonard application, busy tone thereupon being returned to the calling line.

Responsive to disconnect by the called party, the connector and preceding connection is restored returning connector 1000 to an idle condition for receiving another call.

In the event the called line is idle, operations occur, as described in the Leonard application, to operate switch relay 1002. Relay 1002, at its break contacts 1 restores the chain relay 1016 to free the common equipment; its make contacts 1 and 2 extend the tip and ring conductors T and R of the calling line through the operated switch to the called line conductors L1 and L2; its make contacts 3 ground the sleeve conductor S to operate the cutoff relay of the line circuit LC–1 of the called line to prevent line-finding action from occurring responsive to answer by the called party; and its make contacts 11 ground the lock lead L to lock the hold magnet HM operated to maintain the established connections intact.

At such time, connector 1000 signals the called party in the usual way and responsive to called party answer, the concerned parties may converse.

Responsive to disconnect by the calling party, connector 1000 is cleared out by the opening of the line loop which results in the restoration of line relay 1004 and release relay 1010, the release of such relays resulting in the clearout of the counters and all operated relays.

A detailed description of the operation of connector 1000 in extending a test connection to any desired line in response to seizure from test board TB will now be described.

Responsive to the dialing of the hundreds digit indexing the connector group containing connector 1000, by the wire chief or some other authorized personnel at test board TB, operations occur to position test switch T–SW to select the trunk wires 1095 extending to the combined regular and test connector 1000. Switch T–SW is a six-wire, ten horizontal, twenty-five vertical switch which has access to the test connectors only and by test equipment (not shown) at test board TB, the trunk wire IT is tested to determine the idle or busy condition of connector 1000. Upon finding the connector 1000 idle, the hold magnet HM of switch T–SW is operated connecting the conductors of cable 1095 to the test board, wire ST being grounded at off-normal contacts of switch T–SW.

The seizure of connector 1000 thereafter is accomplished by the extension of the line loop from the test board across the tip and ring conductors T and R in the same manner as a regular call received over trunk 1075. At the same time, ground on start wire ST operates the distributor start relay 1018 to condition connector 1000 for test connector operation. Make contacts 3 of relay 1018 transfer the forward sleeve conductor S of connector 1000 from the controller to the test board TB over the associated conductor S, the tip and ring conductors being connected directly to the test board over associated conductors T and R. In this manner, the outgoing or forward conductors T, R, and S of connector 1000 are directly accessible by the test board. Make contacts 4 of relay 1018 prepare a circuit for marking the called sleeve conductor busy; its make contacts 5 extend ground from make contacts on the release relay through break contacts 5 of series auxiliary relay 1012 to the lock lead L in preparation for locking the hold magnet operated; its make contacts 6 prepare a controlled locking circuit for the busy relay; its make contacts 7 prepare an operate circuit for the reset relay 1019; its make contacts 8 and 9 prepare other test connection control circuits; and its break contacts 10 open the tone circuit to prevent busy tone or other tones from being transmitted to the test board.

Responsive to the dialing of the tens and units digit of any desired line, operations occur in connector 1000 to actuate the tens register TR and the units register UR in the manner hereinbefore described, by the operation of line relay 1004 responding to the circuit interruption impulses constituting the tens and units digits. Following the dialing of such digits, the chain operate circuit is completed to controller CR–1, which upon being taken for use responds to the marked tens and units wires to control switch SW1 to make connection with the called line by the operation of the concerned hold magnet HM of switch SW1. Hold magnet HM of SW1 locks operated to ground on lock lead L, now under control of series auxiliary relay 1012. At such time, however, the called line is marked busy by the noted appearance of ground on the called sleeve conductor from make contacts 4 of distributor start relay 1018 and make contacts 1 of chain relay 1016. In response to the called line being so marked, connector controller CR–1 grounds the busy conductor BU operating busy relay 1015 as previously noted. Busy relay 1015 operates and locks operated through its make contacts 1 to the same ground controlling the hold magnet HM of switch SW1.

Responsive to the operation of busy relay 1015, the chain circuit is opened at contacts 2 of relay 1015, returning the common control apparatus to common use and restoring chain relay 1016. At the same time, ground is projected forward over the sleeve conductor S from the test board TB and through make contacts 3 of distributor start relay 1018 to operate the cutoff relay of the line circuit LC1 of the called line.

At such time, switch relay 1002 is unoperated as the selected line is marked busy as noted and the tip, ring, and sleeve conductors of the called line, freed of all line attachments, are extended to the test board TB, permitting the wire chief thereat to make any desired tests on such line.

Following the completion of any desired tests to be made on the called line, the wire chief, by dialing a single digit "1" may cause the connection to the called line to be released and a new connection to be set up to the next succeeding line.

Assuming that the original connection was set up by the dialing of the tens digit 1 and the units digit 1, the tens wire T1 and the units wires U1 were grounded to cause the connector controller to position the select magnets and hold magnet corresponding to such line to operate to make connection therewith.

Responsive to the dialing of the digit 1, line relay 1004 is momentarily restored and delivers a single ground impulse over wire 1038 and wire 1034 to advance the units register UR contacts one step, in this manner connecting units wire U2 to control wire 1049. At the same time, the single ground impulse on wire 1034 is extended through make contacts 9 of distributor start relay 1018 and break contacts 6 of reset relay 1019, to the battery-connected winding of series relay 1011, operating it momentarily.

Responsive to the operation of series relay 1011, its make contacts 1 extend ground potential to the battery-connected winding of series auxiliary relay 1012, operating it. Break contacts 5 of series auxiliary relay 1012 remove the ground at contacts 10 of release relay 1010 from the lock conductor L and from the winding of busy relay 1015, releasing busy relay 1015 and hold magnet HM, resulting in the restoration of switch SW1.

After the holdover time of series relay 1011 elapses, it restores and at its contacts 1 and contacts 1 of yet operated series auxiliary relay 1012, completes an operate circuit for sequence counter Seq causing it to advance its contact sets another step.

With busy relay 1015 restored, an operate circuit for the chain relay 1016 is again completed at make contacts 2 thereof, permitting connector controller CR–1 to be taken for use again. However, this time the units wire U2 is grounded instead of the units wire U1.

Connector controller CR–1 functions in the manner hereinbefore noted to position the principal and auxiliary select magnets to select the line corresponding to the tens and units digit of the newly-marked line and to operate the hold magnet HM to make connection thereto. At such time, the connector controller finds the selected line busy responsive to the ground on the called sleeve conductor from make contacts 4 of relay 1018.

The operation of connector 1000 in responding to the busy indication received from controller CR–1 is as previously described, resulting in a test connection between the next succeeding line and the test board.

In the above described manner, the wire chief may dial a succession of single digits, each time releasing connector switch SW1 and controlling the units register UR to ground the next succeeding units wire to cause controller CR–1 to exercise control over switch SW1 to make connection with the next succeeding line. Connector 1000 is arranged to respond to any other dialed digit value which will advance it to its tenth or last position. At such time, a delay introduced permits the units register to restore and the tens register to be advanced to its next succeeding position, such operation being described hereinafter.

Assuming the tens register to be positioned on tens wire T1 and units register UR to be positioned on the units wire U9 (not shown) the dialing of a single digit 1 advances the contact sets of register UR to its tenth position. Responsive to the restoration of the series relay 1011 thereafter and the consequent completion of the chain operate circuit, ground on wire 1049 is extended through make contacts 10 of units register UR and through make contacts 7 of distributor start relay 1018 to the battery-connected winding of reset relay 1019. Relay 1019 operates through its lower winding and locks operated through its upper winding and its make contacts 4 to the ground at make contacts 1 of units register UR; its make contacts 1 prepare a knockdown circuit for the units register UR; its make contacts 2 prepare an operate circuit for delivering one stepping impulse to the tens register TR; its make contacts 3 places an additional ground of the units register UR off-normal conductor to maintain the clearout circuit intact; its make contacts 5 and make contacts 8 of relay 1018 extend a new ground to the units wire U0; and its break contacts 6 open the operate circuit of series relay 1011. At such time, the connector controller CR–1 responds to the marked tens wire T1 and the marked units wire U0 to control switch SW1 to make connection with the next succeeding line, such line being in the same tens line group as the preceding line.

Responsive to the connector controller testing the called sleeve conductor and finding it busy and the consequent grounding of the busy wire BU, busy relay 1015 is operated, restoring chain relay 1016. Ground from make contacts 1 of relay 1018 is now extended through make contacts 11 of restored chain relay 1016 and through contacts 1 and 2 of relay 1019 to restore units register UR by energizing its restoring winding and to operate tens register TR, advancing its contact set to its next position, thereby selecting the tens wire corresponding to the next succeeding group of ten lines and restoring the units register UR in preparation for receiving the next digit, if such digit is forthcoming.

Responsive to the restoration of the units register UR, ground is removed from the locking winding of reset relay 1019 permitting it to restore, returning the reset relay to normal unoperated condition. At such time, counter TR is positioned on wire T2 and counter UR is in a restored condition the connection in the last selected line remaining intact.

Responsive to the dialing of another digit "1" by the wire chief after the desired tests on the last selected line have been completed, the units register actuates its contact set 1 in preparation for grounding the units wire U1 in the ten line group corresponding to the grounded selected tens wire T2. The operation of the series relays and the restoration of the busy relay and crossbar switch thereafter to result in a connection to the next succeeding line is as previously described.

All of the lines in any desired 100 line group may be tested in the manner hereinbefore described, the tens register TR upon reaching its tenth and final position together with the units register UR being positioned on the last line in such group requires the test train to be restored, as further dialing would result in a restoration of the last test connection and the establishment of a connection to the first line in the last ten-line group.

Clearout by the wire chief at test board TB removes ground from start wire ST and opens the line loop across line relay 1004, permitting test connector 1000 to be cleared out and placed in condition for receiving another call from a subscriber line or from another call from test board TB.

While I have described above the principles of my invention in connection with specific apparatus, it is to be clearly understood that this description is made only by way of example and not as a limitation to the scope of my invention.

I claim:

1. In an automatic switching system including a group of lines having respective call designations assigned thereto, a trunk having a first branch and a second branch, a combined regular and test connector for enabling a regular connection to be extended to any desired called one of the lines responsive to seizure of the connector over the first branch of the trunk, and for enabling a test connection to be extended to any such line responsive to seizure of the connector over the second branch of the trunk, register means in the connector, means operable responsive to control over the trunk for setting the said register means in accordance with the call designation of any desired called one of said lines, crossbar switches, means dependent upon the said setting of the register means for operating the crossbar switches to connect the trunk to the called line, cutoff means normally responsive to the said operation of the crossbar switches for preventing any further operation thereof responsive to any further setting of the said register means while the existing seizure of the test connector is maintained, means in the test connector responsive to its seizure over the said second branch of the associated trunk for disabling the said cutoff means, and means dependent upon the said disabling of the cutoff means for reoperating the crossbar switches responsive to a further setting of the said register means in accordance with the call designation of a different called one of said lines, while the existing seizure of the test connector is maintained, to transfer the said connection from the initial called line to said different called line.

2. In an automatic switching system including a group of lines having respective call designations assigned thereto, a trunk having first and second branches, a combined regular and test connector for enabling a regular connection to be extended to any desired called line responsive to seizure of the connector over the first branch of the trunk and for enabling a test connection to be extended to any desired called line responsive to seizure of the connector over the second branch of the trunk, a controller common to the connector and other apparatus, individualizing means for the connector and means for operating it to temporarily individualize the controller with the connector, register means for the connector and means for setting it according to the call designation of any desired called one of the lines, crossbar switches, means dependent upon the controller being currently individualized with the connector for operating the crossbar switches to connect the trunk to the called line indexed by the register setting, means normally responsive to the said operation of the crossbar switches for restoring the individualizing means and for disabling it from reoperating so long as the existing first-branch seizure of the connector is maintained, means in the connector responsive to its seizure over the second branch of the trunk for nullifying the said disabling means to thereby permit succeeding individualizations of the controller with the test connector while the second-branch seizure is maintained, the register setting means being effective to reset the register means according to the call designation of a different called line following each individualization, and means including the said switch-operating means for reoperating the crossbar switches upon each said succeeding individualization to transfer the existing connection from the previously connected called line to the called line indexed by the reset register means.

3. In a connector for enabling calling lines to be connected to respective called ones of a group of associated lines, each line having a multi-digit number assigned thereto, digit registers for the respective digits of any such number, means for seizing the connector subject to its being idle and for connecting a calling line thereto, means operable responsive to control over the calling line for setting the digit registers in accordance with the respective digits of the multi-digit number of any desired called line, crossbar switches, means controlled by the setting of the digit registers for operating the crossbar switches to connect the calling line to the called line, and means responsive to further control over the calling line while the seizure of the connector is maintained for resetting the digit registers in accordance with the multi-digit number of a desired other line, and means for restoring the said switches and reoperating them to transfer the connection from the connected called line to the said desired other line.

4. In a connector as set forth in claim 3, the said digit registers including a tens register and a units register corresponding respectively to the tens and units digits of any of the said numbers, and the said means for resetting the said digit registers comprising means for resetting the units register in accordance with the next higher digit value while leaving the tens register set.

5. In a connector as set forth in claim 4, means responsive to the said resetting of the units register which bring the units register setting into accordance with its highest digit value for changing the setting of the tens register to its next succeeding digit value and for cancelling the setting of the said units register.

References Cited in the file of this patent

UNITED STATES PATENTS

| | | |
|---|---|---|
| 2,185,287 | Beaumont | Jan. 2, 1940 |
| 2,327,458 | Relfe | Aug. 24, 1943 |
| 2,371,989 | Griffins et al. | Mar. 20, 1945 |